(12) United States Patent
Brandt et al.

(10) Patent No.: US 10,052,577 B2
(45) Date of Patent: Aug. 21, 2018

(54) SELF-CLEANING OIL FILTER HOUSING

(71) Applicant: Caterpillar Inc., Peoria, IL (US)

(72) Inventors: Daniel S. Brandt, Lafayette, IN (US);
Colin A. Hawkins, Lafayette, IN (US);
Viorel Petrariu, Lafayette, IN (US);
Douglas E. Davis, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 275 days.

(21) Appl. No.: 15/045,334

(22) Filed: Feb. 17, 2016

(65) Prior Publication Data
US 2017/0232370 A1 Aug. 17, 2017

(51) Int. Cl.
| | |
|---|---|
| *B01D 35/30* | (2006.01) |
| *B01D 29/05* | (2006.01) |
| *B01D 35/00* | (2006.01) |
| *B01D 1/00* | (2006.01) |
| *B01D 3/00* | (2006.01) |

(Continued)

(52) U.S. Cl.
CPC ........... *B01D 35/30* (2013.01); *B01D 35/005* (2013.01)

(58) Field of Classification Search
CPC ... B01D 1/00; B01D 3/00; B01D 3/28; B01D 17/00; B01D 19/00; B01D 29/055; B01D 29/21; B01D 35/005; B01D 35/14; B01D 35/18; B01D 35/185; B01D 35/30; B01D 2201/24; B01D 2201/29; B01D 2201/30; B01D 2201/302; B01D 2201/34; B01D 2201/40; B01D 2201/4084
USPC ........ 184/6.24, 109; 196/46, 46.1, 112, 114, 196/115, 121, 123, 124, 125, 126, 128, 196/137, 149; 208/179; 210/78, 85, 90, 210/120, 168, 175, 180, 181, 182, 183, 210/184, 188, 189, 232; 250/429, 436, 250/438

See application file for complete search history.

(56) References Cited

U.S. PATENT DOCUMENTS

| | | | | |
|---|---|---|---|---|
| 2,243,559 | A | * 5/1941 | Griffith | .................. B01D 29/48 210/107 |
| 6,264,831 | B1 | * 7/2001 | Hawkins | ................ B01D 35/26 210/249 |
| 6,379,537 | B1 |   4/2002 | Brieden et al. | |

(Continued)

FOREIGN PATENT DOCUMENTS

| | | |
|---|---|---|
| CN | 201546855 | 8/2010 |
| JP | 2006112435 | 4/2006 |
| JP | 4376615 | 12/2009 |

*Primary Examiner* — Hayden Brewster
(74) *Attorney, Agent, or Firm* — Oblon, McClelland, Maier & Neustadt

(57) ABSTRACT

A self-cleaning oil filter housing is disclosed. The self-cleaning oil filter housing includes a hollow elongated body. The hollow elongated body has a central axis and a transverse axis perpendicular to the central axis. The self-cleaning oil filter housing includes a first flange provided on an outer surface of the hollow elongated body. The first flange has a first through hole along a first tangential direction. The self-cleaning oil filter housing includes a second flange provided on the outer surface of the hollow elongated body. The second flange has a second through hole along a second tangential direction. An angle between the first tangential direction and the second tangential direction is pre-determined. The self-cleaning oil filter housing includes a rib portion extending between the first flange and the second flange.

18 Claims, 4 Drawing Sheets

(51) Int. Cl.
    *B01D 17/00* (2006.01)
    *B01D 19/00* (2006.01)

(56) References Cited

U.S. PATENT DOCUMENTS

| | | |
|---|---|---|
| 7,300,581 B2 | 11/2007 | Seipold |
| 8,726,858 B2 | 5/2014 | Hiyoshi et al. |
| 2009/0107904 A1* | 4/2009 | Mangano ............... B01D 29/23 210/232 |

* cited by examiner

SELF-CLEANING OIL FILTER HOUSING

TECHNICAL FIELD

The present disclosure is related to a self-cleaning oil filter assembly, and more particularly relates to a self-cleaning oil filter housing.

BACKGROUND

Self-cleaning oil filters are used in various systems, such as internal combustion engines. The self-cleaning oil filters may be used to filter fluids, such as lubrication oil, hydraulic oil, engine oil, and transmission oil. Such self-cleaning oil filters include a housing for enclosing one or more replaceable filter elements therein, and for providing a means for mounting a self-cleaning oil filter to a support surface. Most of the oil filter housings manufactured today can be directly mounted on an engine body of the internal combustion engines by means of a bracket and one or more fasteners. These housing may include multiple internally threaded holes that engage with external threads of the fasteners.

An exemplary system for mounting an oil filter in an internal combustion engine is disclosed in JP Pat. No. 2006/112435 (the '435 Patent). The '435 patent's auxiliary device mounting structure includes a first auxiliary mounting part formed on a sidewall part of an oil pan at an extension position of first and second bearing cap parts. The auxiliary device mounting structure also includes a second auxiliary mounting part formed at an extension position of a third bearing cap part. A compressor is fixed to the first auxiliary mounting part and an oil filter is fitted to a second auxiliary mounting part. Although the mounting structure may function adequately for its intended application, it is susceptible to frequent failure due to the configuration of the mounting part of the '435 patent.

The oil filter system of the present disclosure is directed towards overcoming one or more of the problems set forth above and/or other problems of the prior art.

SUMMARY OF THE DISCLOSURE

In an aspect of the present disclosure, a self-cleaning oil filter housing is disclosed. The self cleaning oil filter housing includes a hollow elongated body. The hollow elongated body has a central axis and a transverse axis perpendicular to the central axis. The self cleaning oil filter housing includes a first flange provided on an outer surface of the hollow elongated body. The first flange has a first through hole along a first tangential direction. The self cleaning oil filter housing includes a second flange provided on the outer surface of the hollow elongated body. The second flange has a second through hole along a second tangential direction. An angle between the first tangential direction and the second tangential direction is pre-determined.

In another aspect of the present disclosure, a self-cleaning oil filter housing is disclosed. The self-cleaning oil filter housing includes a hollow elongated body. The hollow elongated body has a central axis and a transverse axis perpendicular to the central axis. The self-cleaning oil filter housing includes a first flange provided on an outer surface of the hollow elongated body. The first flange has a first through hole along a first tangential direction. The self-cleaning oil filter housing includes a second flange provided on the outer surface of the hollow elongated body. The second flange has a second through hole along a second tangential direction. An angle between the first tangential direction and the second tangential direction is pre-determined. The self-cleaning oil filter housing includes a rib portion extending between the first flange and the second flange.

In yet another aspect of the present disclosure, a self-cleaning oil filter assembly is disclosed. The self-cleaning oil filter assembly includes a bracket member having a first threaded hole and a second threaded hole. The self-cleaning oil filter assembly includes a self-cleaning oil filter housing. The self-cleaning oil filter housing includes a hollow elongated body. The hollow elongated body has a central axis and a transverse axis perpendicular to the central axis. The self-cleaning oil filter housing includes a first flange provided on an outer surface of the hollow elongated body. The first flange has a first through hole along a first tangential direction. The first through hole is aligned with the first threaded hole of the bracket member. The self-cleaning oil filter housing includes a second flange provided on the outer surface of the hollow elongated body. The second flange has a second through hole along a second tangential direction. The second through hole is aligned with the second threaded hole of the bracket member. An angle between the first tangential direction and the second tangential direction is pre-determined. The self-cleaning oil filter housing includes a rib portion extending between the first flange and the second flange. The rib portion is in frictional contact with the bracket member.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
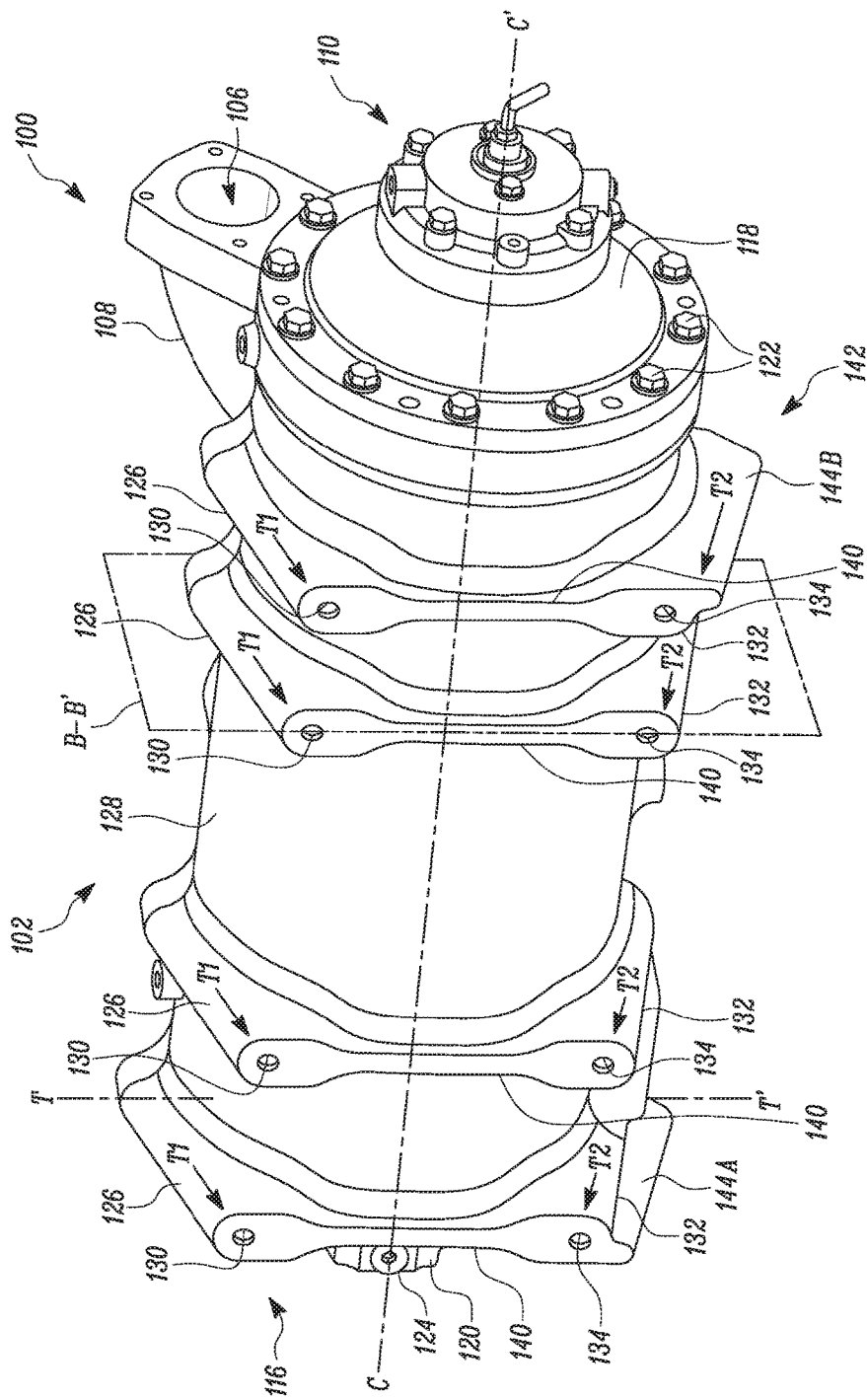
FIG. 1 is a rear perspective view of a self-cleaning oil filter housing, according to an embodiment of the present disclosure.
Figure 2:
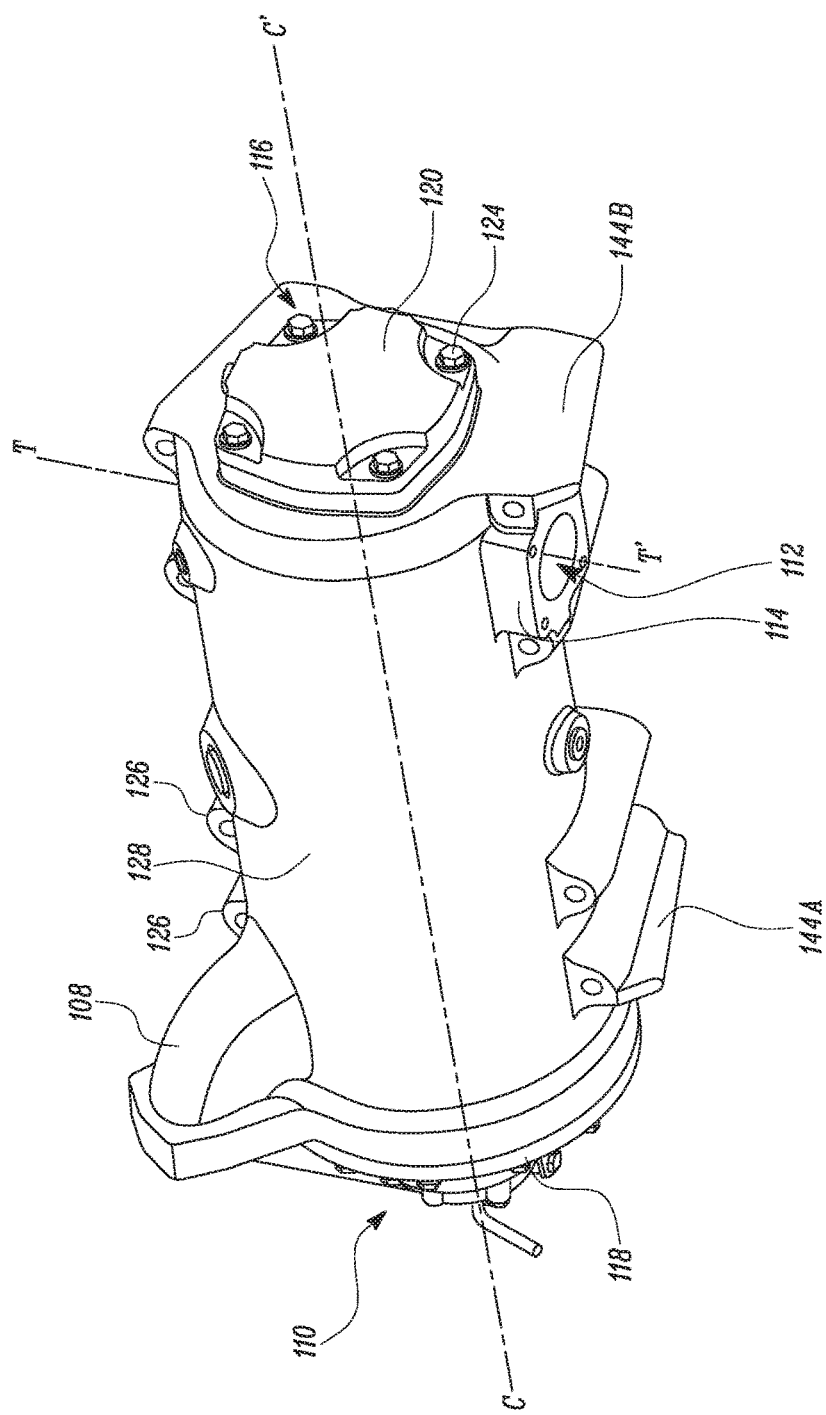
FIG. 2 is a front perspective view of the self-cleaning oil filter housing, according to an embodiment of the present disclosure.

FIG. 1 and FIG. 2 show different views of a self-cleaning oil filter housing 100, according to an embodiment of the present disclosure. The self-cleaning oil filter housing 100 may be used to enclose one or more filter elements (not shown) configured to filter fluids associated with various fluid systems, such as a lubrication system, a steering system, a hydraulic braking system, a fuel system, and a hydraulic fluid control system. In an example, the filter elements may be removably received within the self-cleaning oil filter housing 100, such as in a canister type filter assembly. In another example, the filter elements may be fixedly received within the self-cleaning oil filter housing 100, such as in a spin-on type filter assembly.

Further, the self-cleaning oil filter housing 100 may be mounted in a machine (not shown), such as an excavator, a mining truck, a dump truck, and a generator. Consequently, the self-cleaning oil filter housing 100 may be implemented in the fluid systems of the machine. In an embodiment, the self-cleaning oil filter housing 100 is implemented in an engine lubrication system of the machine, and encloses the filter elements configured to filter lubrication oil associated with the engine lubrication system.

The self-cleaning oil filter housing 100 includes a hollow elongated body 102 configured to enclose the filter elements therein. In an embodiment, the hollow elongated body 102 is made of Aluminum, and is substantially cylindrical in shape. The hollow elongated body 102 has a central opening 104 (shown in FIG. 3) configured to receive the filter elements therethrough. The central opening 104 has a circular shape and extends along a length of the self-cleaning oil filter housing 100. The hollow elongated body 102 has a central axis CC' and a transverse axis TT' perpendicular to the central axis CC'.

Although the self-cleaning oil filter housing 100 is shown to have a cylindrical shape, it should be noted that the shape of the hollow elongated body 102 may also have a non-circular shape, such as polygonal and elliptical.

As shown in FIG. 1, the self-cleaning oil filter housing 100 includes an outlet port 106 defined by a first projecting portion 108 on the hollow elongated body 102. The outlet port 106 opens along the central axis CC'. The outlet port 106 is positioned adjacent to a first end 110 of the hollow elongated body 102, and is configured to facilitate discharge of lubrication oil from the central opening 104 of the self-cleaning oil filter housing 100. Specifically, the outlet port 106 discharges the lubrication oil after being filtered by the filter elements disposed in the central opening 104.

As shown in FIG. 2, the self-cleaning oil filter housing 100 includes an inlet port 112 defined by a second projecting portion 114 on the hollow elongated body 102. The inlet port 112 opens along the transverse axis TT'. The inlet port 112 is positioned adjacent to a second end 116 of the self-cleaning oil filter housing 100. The inlet port 112 is configured to facilitate intake of the lubrication oil into the central opening 104.

Referring to FIGS. 1 and 2, the self-cleaning oil filter housing 100 further includes a first plate 118 and a second plate 120. The first plate 118 and the second plate 120 are coupled to the first end 110 and the second end 116 of the hollow elongated body 102, respectively. In an embodiment, the first plate 118 is coupled to the first end 110 of the hollow elongated body 102, via bolts 122, and the second plate 120 is coupled to the second end 116 of the hollow elongated body 102, via bolts 124.

The self-cleaning oil filter housing 100 includes first flanges 126 provided on an outer surface 128 of the hollow elongated body 102. In the illustrated embodiment, the self-cleaning oil filter housing 100 includes four such first flanges 126 which are spaced apart from each other along the central axis CC'. The first flanges 126 may correspond to protrusions of the hollow elongated body 102 such that the self-cleaning oil filter housing 100 has a unitary construction. Alternatively, the first flanges 126 may be external members coupled to the hollow elongated body 102 by various methods such as, welding, adhesives, and fasteners.

Each of the first flanges 126 has a first through hole 130 defined along a first tangential direction "T1" perpendicular to the central axis CC'. In the illustrated embodiment, each of the first through holes 130 is substantially circular in shape, and is configured to receive a first fastening member 136 (shown in FIG. 4). However, in various other embodiments, the first through holes 130 may have non-circular shapes, such as elliptical and polygonal, based on requirements.

The self-cleaning oil filter housing 100 further includes second flanges 132 provided on the outer surface 128 of the hollow elongated body 102. In the illustrated embodiment, the self-cleaning oil filter housing 100 includes four such second flanges 132 which are spaced apart from each other along the central axis CC'. The second flanges 132 are also spaced apart from the first flanges 126 along a periphery of the hollow elongated body 102. The second flanges 132 may correspond to multiple protrusions of the hollow elongated body 102 such that the self-cleaning oil filter housing 100 has a unitary construction. Alternatively, the second flanges 132 may be external members coupled to the hollow elongated body 102 by various methods, such as welding, adhesives, and fasteners.

Each of the second flanges 132 has a second through hole 134 defined along a second tangential direction "T2" perpendicular to the central axis CC'. In the illustrated embodiment, each of the second through holes 134 is substantially circular in shape, and is configured to receive a second fastening member 138. However, in various other embodiments, the second through holes 134 may have non-circular shapes such as, elliptical and polygonal, based on requirements.

It should be noted that the size, shape, and numbers of each of the first through holes 130 and the second through holes 134 are merely exemplary and non-limiting of this disclosure. The self-cleaning oil filter housing 100 may include any number of the first through holes 130 and the second through holes 134 depending upon an application of the self-cleaning oil filter housing 100.

The self-cleaning oil filter housing 100 includes rib portions 140 extending between the first flanges 126 and the second flanges 132. In the illustrated embodiment, the self-cleaning oil filter housing 100 includes four such rib portions 140. However, in various other embodiments, the self-cleaning oil filter housing 100 may include any number of rib portions. The rib portions 140 provide rigidity to the self-cleaning oil filter housing 100.

In an embodiment, the self-cleaning oil filter housing 100 further includes multiple feet portions 142 attached to the outer surface 128 of the hollow elongated body 102. The feet portions 142 are adapted to support the self-cleaning oil filter housing 100 on a ground surface or a workbench during servicing and/or maintenance of the self-cleaning oil filter housing 100. In the illustrated embodiment, the feet portions 142 include a first feet portion 144A provided on the second flange 132 adjacent to the first end 110, and a second feet portion 144B provided on the second flange 132 adjacent to the second end 134.

Figure 3:
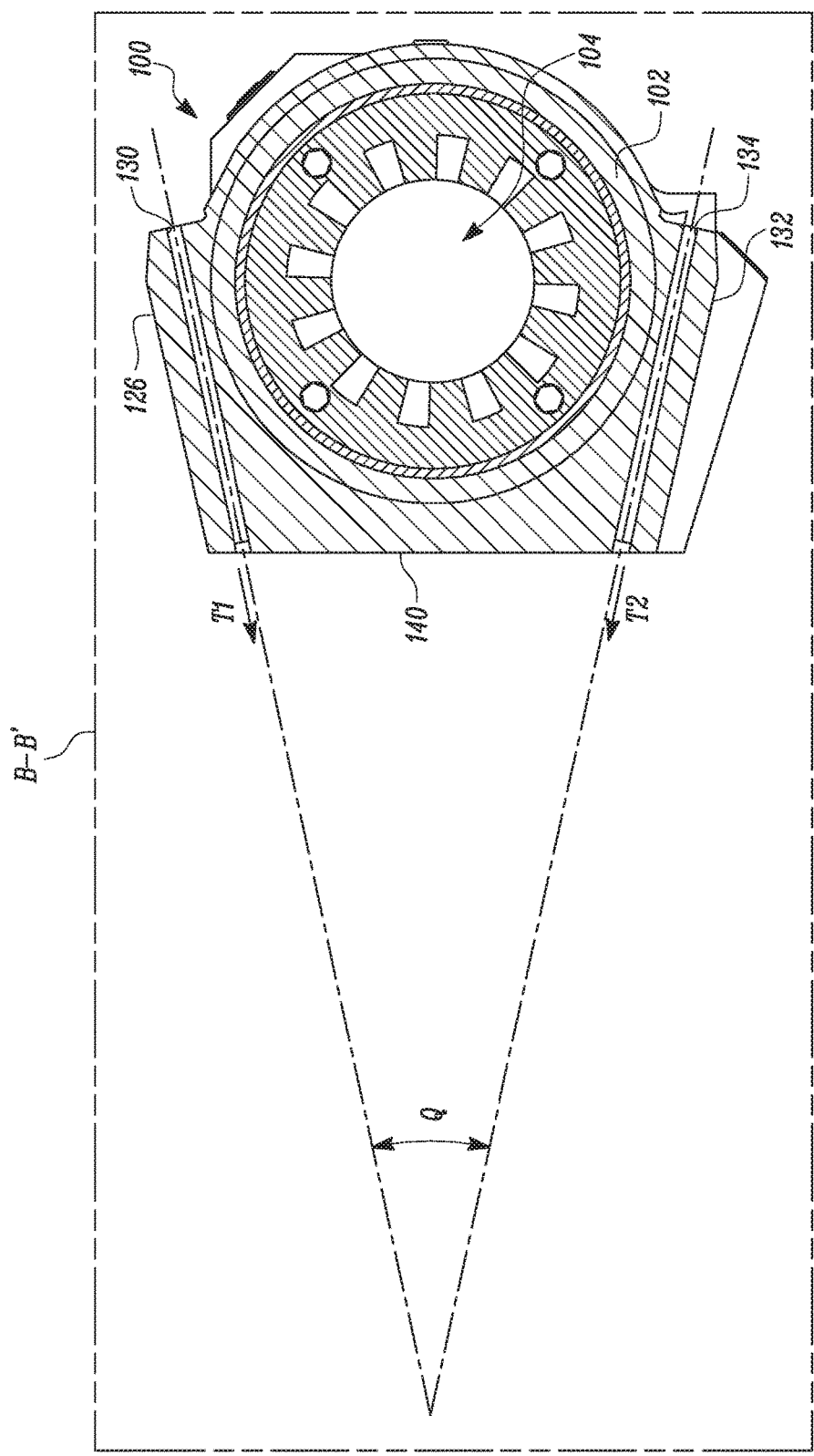
FIG. 3 is a sectional view of the self-cleaning oil filter housing along a plane B-B' in FIG. 1, according to an embodiment of the present disclosure.

FIG. 3 illustrates a sectional view of the self-cleaning oil filter housing 102 taken along a transverse plane B-B' in FIG. 1. In an embodiment, the first through holes 130 defined along the first tangential direction "T1" are inclined with respect to the second though holes 134 defined along the second tangential direction "T2" in the transverse plane B-B'. An angle "Q" between the first tangential direction "T1" and the second tangential direction "T2" is predetermined. The angle "Q" may be selected based on a space available for mounting the self-cleaning oil filter housing 100. The angle "Q" may also vary with different applications of the self-cleaning oil filter housing 100. In an embodiment, the angle "Q" between the first tangential direction "T1" and the second tangential direction "T2" in the transverse plane B-B' of the self-cleaning oil filter housing 100 is at least 25 degrees.

Figure 4:
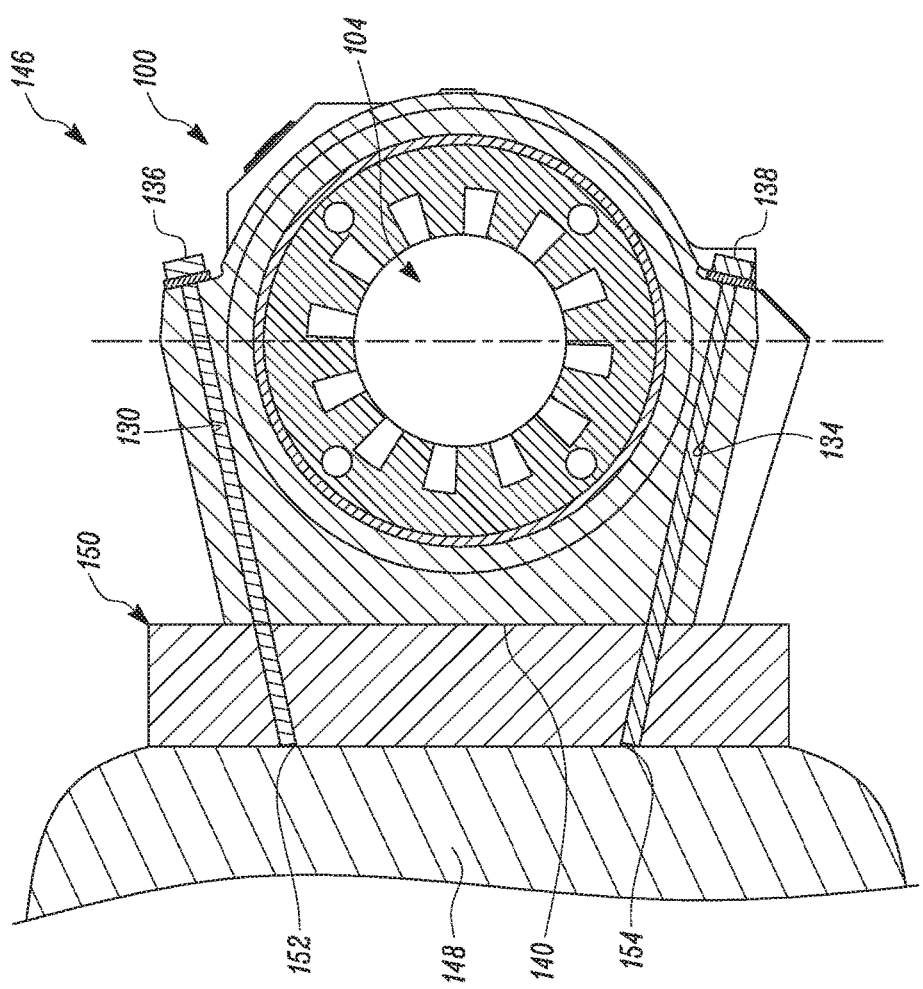
FIG. 4 is a sectional view of a self-cleaning oil filter assembly, according to an embodiment of the present disclosure.

FIG. 4 illustrates a sectional view of a self-cleaning oil filter assembly 146, according to an embodiment of the present disclosure. The self-cleaning oil filter assembly 146 may be mounted at any location, such as a support surface 148 in the machine. In an embodiment, the support surface 148 may correspond to an outer surface of an engine block. The self-cleaning oil filter assembly 146 includes a bracket member 150 attached to the support surface 148 and the self-cleaning oil filter housing 100.

The bracket member 150 is adapted to mount the self-cleaning oil filter housing 100 on the support surface 148. The bracket member 150 may include a first threaded hole 152 and a second threaded hole 154. In the illustrated embodiment, the bracket member 150 includes four first threaded holes 152 (only one shown) and four second threaded holes 154 (only one shown). The first threaded holes 152 are configured to engage with the first fastening members 136, and the second threaded holes 154 are configured to engage with the second fastening members 138 in order to couple the self-cleaning oil filter housing 100 with the support surface 148.

During mounting of the self-cleaning oil filter housing 100 on the support surface 148, the first through holes 130 are aligned with the first threaded holes 152 of the bracket member 150. Simultaneously, the second through holes 134 are aligned with the second threaded holes 154 of the bracket member 150. In order to couple the self-cleaning oil filter housing 100 with the bracket member 150, the first fastening members 136 are inserted into the first through holes 130 and the first threaded holes 152, and the second fastening members 138 are inserted into the second through holes 134 and the second threaded holes 154. The first fastening members 136 and the second fastening members 138 engage with the first threaded holes 152 and the second threaded holes 154, respectively. Further, the rib portions 140 are disposed in frictional contact with the bracket member 150 such that a slippage between the self-cleaning oil filter housing 100 and the bracket member 150 may be prevented.

It should be noted that the bracket member 150 may include any number of the first threaded holes 152 and the second threaded holes 154 depending upon requirements. Moreover, the first threaded holes 152 and the second threaded holes 154 may also be suitably arranged in the bracket member 150 based on requirements.

INDUSTRIAL APPLICABILITY

The present disclosure is related to the self-cleaning oil filter housing 100. The self-cleaning oil filter housing 100 is mounted on the support surface 148 by means of the bracket member 150, the first fastening members 136 and the second fastening members 138. In an example, the bracket member 150 may be integrally formed with the support surface 148. In another example, the bracket member 150 may be an external member coupled to the support surface 148 by various methods, such as fastening and adhesives. Hence, the self-cleaning oil filter housing 100 may be conveniently retrofittable with an existing engine. Further, shape and dimensions of the inlet port 106 and the outlet port 112 may be suitably chosen based on an application of the self-cleaning oil filter housing 100.

The self-cleaning oil filter housing 100 includes the first through holes 130 and the second through holes 134 defined by the first flanges 126 and the second flanges 132, respectively. The first and second through holes 130, 134 may impart compression stress in the hollow elongated body 102 during assembly of the self-cleaning oil filter housing 100, thereby preventing any possible failures of the self-cleaning oil filter assembly 146. Additionally, the rib portions 140 of the self-cleaning oil filter housing 100 are in frictional contact with the bracket member 150. The rib portions 140 provide more contact area between the self-cleaning oil filter housing 100 and the bracket member 150. Hence, slippage between the self-cleaning oil filter housing 100 and the bracket member 150 may be prevented, thereby reducing machine downtimes.

The self-cleaning oil filter housing 100 allows a user to easily install, assemble and service the self-cleaning oil filter assembly 146. The self-cleaning oil filter housing 100 may be supported on the feet portions 142 on a ground surface or a workbench during servicing and/maintenance thereof. The self-cleaning oil filter housing 100 may be supported such that lubrication oil may be easily drained through the inlet port 112. Moreover, as the outlet port 106 may be kept horizontally along the central axis CC' during maintenance and/or servicing. The self-cleaning oil filter housing 100 prevents contamination of lubrication oil from above the self-cleaning oil filter housing 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A self-cleaning oil filter housing, comprising:
   a hollow elongated body having a central axis and a transverse axis perpendicular to the central axis;
   a first flange provided on an outer surface of the hollow elongated body, the first flange has a first through hole along a first tangential direction relative to the central axis of the hollow elongated body; and
   a second flange provided on the outer surface of the hollow elongated body, the second flange has a second through hole along a second tangential direction relative to the central axis of the hollow elongated body,
   wherein, in an end view, an angle formed between the first tangential direction and the second tangential direction of the first through hole and the second through hole, respectively, is pre-determined and non-zero,
   wherein the first through hole extends along a first longitudinal axis thereof from a first side of the first flange to a second side of the first flange opposite the first side of the first flange,
   wherein the second through hole extends along a second longitudinal axis thereof from a first side of the second flange to a second side of the second flange opposite the first side of the second flange,
   wherein both ends of the first and second through holes are external to an inner volume defined by the hollow elongated body, and
   wherein the first longitudinal axis of the first through hole and the second longitudinal axis of the second through hole are entirely outside of the inner volume defined by the hollow elongated body.

2. The self-cleaning oil filter housing of claim 1 comprising a rib portion extending between the first flange and the second flange.

3. The self-cleaning oil filter housing of claim 1 comprising a feet portion attached to the outer surface of the hollow elongated body.

4. The self-cleaning oil filter housing of claim 1 comprising an inlet port defined along the transverse axis of the hollow elongated body.

5. The self-cleaning oil filter housing of claim 1 comprising an outlet port defined along the central axis of the hollow elongated body.

6. The self-cleaning oil filter housing of claim 1, wherein the angle between the first tangential direction and the second tangential direction in a transverse plane of the self-cleaning oil filter housing is at least 25 degrees.

7. A self-cleaning oil filter housing, comprising: a hollow elongated body having a central axis and a transverse axis perpendicular to the central axis;
a first flange provided on an outer surface of the hollow elongated body, the first flange has a first through hole along a first tangential direction relative to the central axis of the hollow elongated body;
a second flange provided on the outer surface of the hollow elongated body, the second flange has a second through hole along a second tangential direction relative to the central axis of the hollow elongated body; and
a rib portion extending between the first flange and the second flange,
wherein, in an end view, an angle formed between the first tangential direction and the second tangential direction of the first through hole and the second through hole, respectively, is pre-determined and non-zero,
wherein the first through hole extends along a first longitudinal axis thereof from a first side of the first flange to a second side of the first flange opposite the first side of the first flange,
wherein the second through hole extends along a second longitudinal axis thereof from a first side of the second flange to a second side of the second flange opposite the first side of the second flange,
wherein both ends of the first and second through holes are external to an inner volume defined by the hollow elongated body, and
wherein the first longitudinal axis of the first through hole and the second longitudinal axis of the second through hole are entirely outside of the inner volume defined by the hollow elongated body.

8. The self-cleaning oil filter housing of claim 7 comprising a feet portion extending from the second flange along the transverse axis.

9. The self-cleaning oil filter housing of claim 7 comprising an inlet port defined along the transverse axis of the hollow elongated body.

10. The self-cleaning oil filter housing of claim 7 comprising an outlet port defined along the central axis of the hollow elongated body.

11. The self-cleaning oil filter housing of claim 7, wherein the angle between the first tangential direction and the second tangential direction in a transverse plane of the self-cleaning oil filter housing is at least 25 degrees.

12. A self-cleaning oil filter assembly comprising:
a bracket member having a first threaded hole and a second threaded hole; and
a self-cleaning oil filter housing, comprising:
a hollow elongated body having a central axis and a transverse axis perpendicular to the central axis, the hollow elongated body having a central opening configured to receive a filter element therethrough;
a first flange provided on an outer surface of the hollow elongated body, the first flange has a first through hole along a first tangential direction relative to the central axis of the hollow elongated body, the first through hole is aligned with the first threaded hole of the bracket member;
a second flange provided on the outer surface of the hollow elongated body, the second flange has a second through hole along a second tangential direction relative to the central axis of the hollow elongated body, the second through hole is aligned with the second threaded hole of the bracket member, wherein, in an end view, an angle formed between the first tangential direction and the second tangential direction of the first through hole and the second through hole, respectively, is pre-determined and non-zero; and
a rib portion extending between the first flange and the second flange, the rib portion is in frictional contact with the bracket member,
wherein the first through hole extends along a first longitudinal axis thereof from a first side of the first flange to a second side of the first flange opposite the first side of the first flange,
wherein the second through hole extends along a second longitudinal axis thereof from a first side of the second flange to a second side of the second flange opposite the first side of the second flange,
wherein both ends of the first and second through holes are external to an inner volume defined by the hollow elongated body, and
wherein the first longitudinal axis of the first through hole and the second longitudinal axis of the second through hole are entirely outside of the inner volume defined by the hollow elongated body.

13. The self-cleaning oil filter assembly of claim 12 comprising a feet portion attached to the outer surface of the hollow elongated body.

14. The self-cleaning oil filter assembly of claim 12 comprising an inlet port along the transverse axis of the hollow elongated body.

15. The self-cleaning oil filter assembly of claim 12 comprising an outlet port along the central axis of the hollow elongated body.

16. The self-cleaning oil filter assembly of claim 12, wherein the hollow elongated body is made of Aluminum.

17. The self-cleaning oil filter assembly of claim 12, wherein the angle between the first tangential direction and the second tangential direction in a transverse plane of the self-cleaning oil filter housing is at least 25 degrees.

18. The self-cleaning oil filter assembly of claim 12, wherein the first through hole and the first threaded hole receive a first fastening member therein, and the second through hole and the second threaded hole receive a second fastening member therein.

* * * * *